June 4, 1957 R. L. SCHULTZ 2,794,387
PLATEN IMPELLING MEANS IN CHECK WRITERS
Filed March 25, 1953 8 Sheets-Sheet 1

Inventor.
Ralph L. Schultz.

United States Patent Office 2,794,387
Patented June 4, 1957

2,794,387

PLATEN IMPELLING MEANS IN CHECK WRITERS

Ralph L. Schultz, Chicago, Ill., assignor to Victor Adding Machine Co., a corporation of Illinois Application March 25, 1953, Serial No. 344,541

5 Claims. (Cl. 101—20)

This invention relates to an accounting machine and more particularly to a check writing machine for imprinting and macerating a check.

It is the general object of this invention to produce a new and improved machine of the character described.

One of the features of the present machine is the provision of means for simply and rapidly aligning a check with the imprinting means of the check writer. Another feature of the invention is the provision of a slot in which a check to be imprinted may be inserted, with the slot being provided with a member supporting one edge of the check together with manually operable means for adjusting the member and thus to shift the check in the slot properly to align it. A further feature of the invention is to provide a check writer having a slanted wall against which a check may rest together with a platform at the bottom of the wall for supporting the bottom edge of the check and to mount the platform for vertical movement so that a check resting thereon may be aligned with the printing means. A corollary feature of the foregoing is the provision of a manually actuable member positioned remote from the check slot for adjusting a check therein so that adjustment may be carried out without danger of the hand of the operator contacting the check to misalign it in the slot.

A further feature of the invention is the provision of key set rack bars for setting up the imprinting means of the check writer for imprinting a check, with the rack bars being spring moved to so set the imprinting means upon the operation of a manual lever and to provide such rack bars with means preventing rebound thereof when they have reached the end of their stroke. A further feature of the invention is the provision of a plurality of pawls, one engaging ratchet teeth on each rack bar so as to prevent rebound of the rack bar, together with clearing means for simultaneously moving all pawls out of engagement with their associated ratchet teeth upon the completion of an operation of the machine so as to permit the rack bars to be returned to their original position.

Another feature of the invention is the provision of ironing means for the inking ribbon of the machine in order to prolong the life of the ribbon. The inking ribbon in a check writer is normally relatively wide and subjected to considerable wear because of the maceration device and pressures used in macerating a check. A normal result of the conditions under which the inking ribbon is used is to produce in the ribbon a great number of wrinkles which necessitates frequent change of ribbon. One of the features of this invention is the provision of an ironing member contacting the ribbon as it is wound on a take-up spool and serving to iron out wrinkles and remove the visible effects of the maceration pressures to which the ribbon has been subjected. Another feature of the invention is the provision of a spring member having elongated ironing surfaces at each end, one to contact each ribbon spool, with the member being rockably mounted on the frame of the machine to exert an equal resilient pressure on the ribbon wound on each spool.

A further feature of the invention is the provision of mounting means for one of the ribbon spools so that the same may readily be removed for replacement of the ribbon. A further feature of the invention is the provision of a ribbon spool rotatably mounted on end trunnions received in a slot in the frame of the machine, with the machine being provided with dog members spring urged against the trunnions to hold the spool in place and simultaneously exert a braking action on the spool, with the dogs being free to pivot against the tension of the springs to permit the spool to be raised out of the slots for replacing the ribbon.

A further feature of the invention is the provision in a check writer of macerating bars to press an interposed check against the imprinting means of the check writer, with the bars being mounted in a manner permitting adjustment to align them with the imprinting means in a relatively simple fashion. A further feature of the invention is the provision of a carrying member for the macerating bars, with the bars being mounted on posts extending through the carrying member and spring urged in one direction together with screw members threadedly received in the carrier and bearing against the macerating bar in opposition to the spring pressure so that rotation of the screw members serves to adjust the bar relative to the imprinting means.

A further feature of the invention is the provision of means for assisting the operator in applying imprinting and macerating pressure to a check. A further feature of the invention is the provision of a return spring for returning a manually actuable lever to its normal position, with the spring being so arranged as to be streached substantially to its fullest extent during the first portion of the stroke of the lever so that during the final portion of the stroke, wherein imprinting and maceration take place, very little further stretching of the return spring occurs and thus diminishing the effect of increasing return spring tension. A further feature of the invention is the inclusion of an equalizing spring which is tensioned during the first portion of the stroke of the lever, which tension is released during the final portion of the stroke, that is, is released during the portion of the stroke wherein imprinting and maceration take place, with the power in the spring as its tension is released operating in parallel with the manual force applied to the lever.

Other and further features of the invention will be readily apparent from the following description and drawings, in which.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

General description

Figures 1, 12:
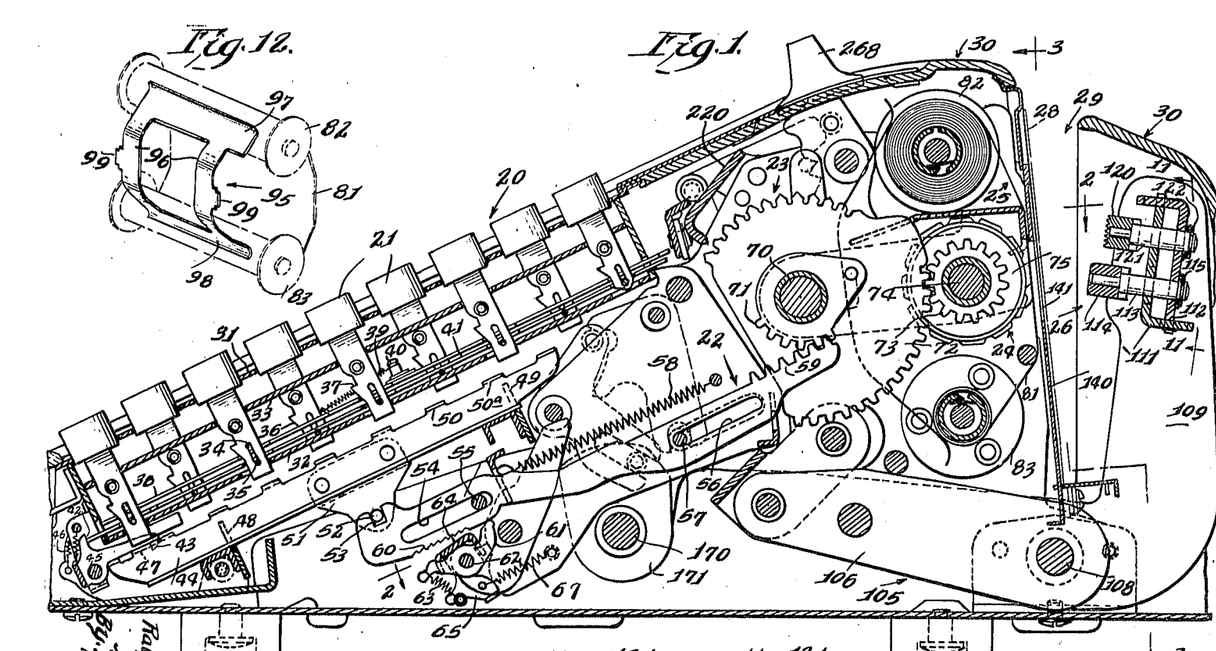
Fig. 1 is a vertical sectional view through a check writer embodying the features of the invention and taken along line 1—1 of Fig. 2.
Fig. 12 is a view showing the construction of the ironing means for the inking ribbons.
Figure 2:
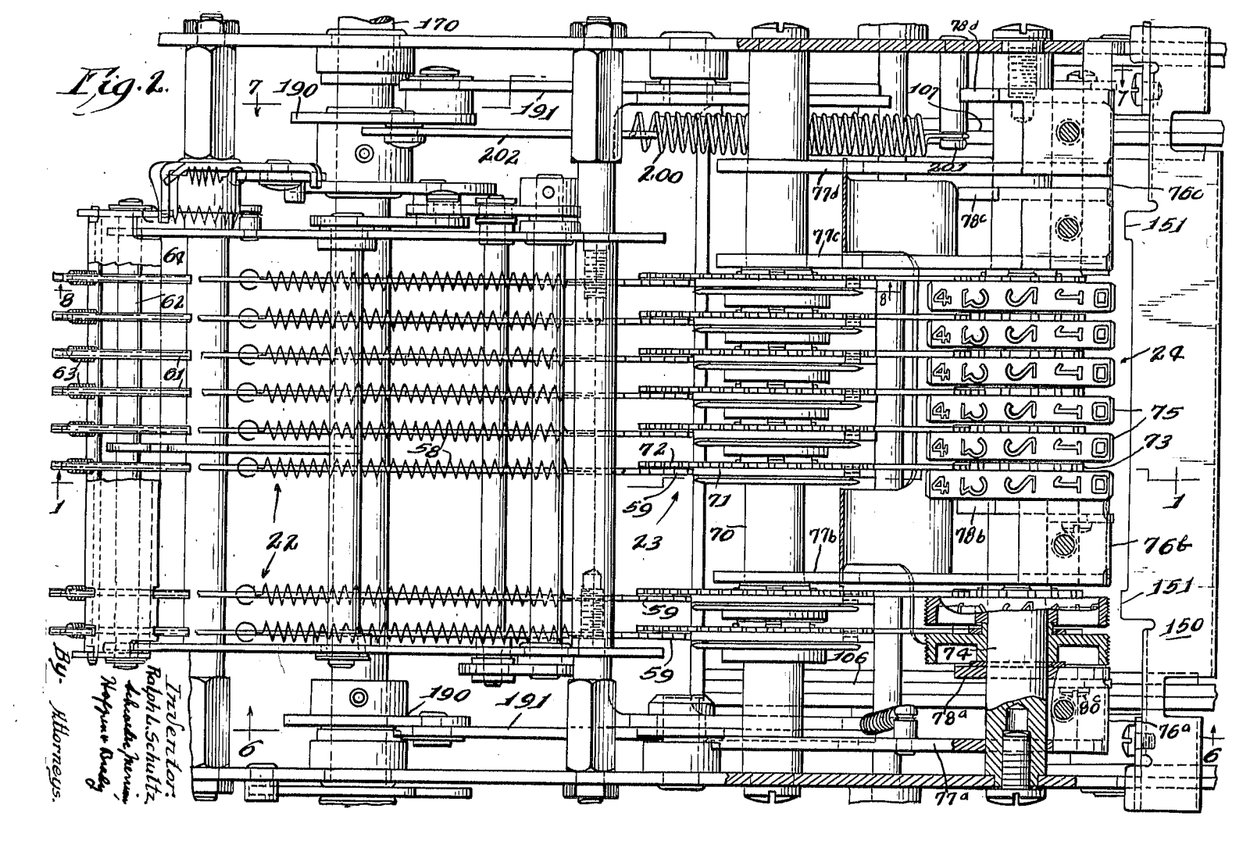
Fig. 2 is an enlarged slanted horizontal section taken substantially along line 2—2 of Fig. 1.

As best shown in Fig. 1, the check writer of this application is provided with a keyboard 20 having a plurality of denominational orders of keys 21 which may be depressed to set up any figure subsequently to be imprinted upon a check. Any number of denominational orders may be used but preferably eight are provided, the first two being in the cents columns and the six columns to the left for the unit, tens, hundreds, etc. of dollars. Located within the machine below the keyboard is a plurality of rack bars 22, one for each order of keys, with the rack bars being mounted to engage gearing 23, rotation of which serves to set up the imprinting means 24 on the check writing machine. Inking means 25 is provided for inking the imprinting means during the imprinting of a check. The imprinting means are constructed to press against one side of a check 28 positioned in a slot 29 while macerating means 26 are provided on the opposed side of the check to press against the imprinting means and simultaneously to macerate the check so as to prevent the figures imprinted thereon from being changed.

A lever 27 (Fig. 3) is provided to be swung forward and back for each imprinting operation and the entire internal mechanism of the check writer is enclosed within a removable cover 30. The cover may be provided with suitable scribe marks on its top and on its side to aid in aligning of the check, with the scribe mark on the side being so located relative to the imprinting and macerating means as to imprint upon the proper line of the check when such line is aligned with the scribe marks. The scribe marks on top of the cover may be used to assist in aligning the check horizontally in the slot 29.

Keyboard and rack bar assembly

Referring now to Fig. 1, the keyboard 20 includes a top frame plate 31, a bottom frame plate 32 and an intermediate frame plate 33, with the bottom and intermediate plates being provided with slots through which the stem of the keys may slide, and with the top plate being provided with openings surrounding each of the keys 21 so that the key may be depressed thereinto. Each of the keys is provided with a vertical slot 34 slidably engaging a guide pin 35 to guide the key in its up and down movement. Each key is provided with a cam surface 36 terminating in a detent portion 37, with the latter portion being adapted to become hooked beneath a catch bar 38 slidably mounted in the machine. It should be understood that a catch bar 38 is provided for each order of the machine. Thus there will be found a catch bar 38 located beneath each ordinal column of keys on the keyboard. The catch bar is provided with notches along its length, each receiving a stem of one of the keys. The catch bar 38 is urged in a movement to the right (as seen in Fig. 1) by means of a spring 39 having one end secured to the catch bar and its other end secured to a pin 40 fixed in the machine. As a key is depressed the cam portion 36 shifts the catch bar slightly against the tension of its spring to permit the detent portion to slide beneath the catch bar whereupon rightward movement of the catch bar under the urging of its spring 39 serves to draw the same over the detent and hold the key in depressed position.

Slidably mounted immediately beneath the catch bars 38 is a release bar 41 positioned so that its front end (the left-hand end as seen in Fig. 1) contacts an arm 42 on a stop bar release hook 43 which serves to hold the stop bar 44 against movement. The hooks 43, there being one for each order, are rotatably mounted on a shaft 45 and each is provided with a spring 46 serving to hold the hook 43 in engagement with a lug 47 provided at the front end of each stop bar 44.

The stop bars 44 are mounted for sliding movement in suitable slots formed in vertical frame plates 48 and 49 in the machine, with each stop bar being provided with a plurality of stop lugs, the alternate lugs 50 being turned to face in one direction while intermediate lugs 50a are turned to face in the opposite direction. Upon depression of a key and the operation of mechanism permitting the stop bar 44 to slide toward the rear of the machine, such motion of the stop bars continues until the appropriate stop lug 50 or 50a strikes the stem of a depressed key which serves to prevent further sliding movement of the stop bar.

Each of the stop bars 44 is connected to its associated rack bar 22 by means of a bracket 51 provided with a pin 52 engaging a notch 53 formed at the front end of the rack bar.

The rack bars 22 are mounted for forward and rearward sliding movement in the frame and to this end are each provided with a slot 54 slidably engaging a forward bar 55 fixed in the frame of the machine. The rear end of the rack bars are provided with a second slot 56 slidably engaging a movable bar 57. Upon rearward movement of the bar 57 the rack bars are free to slide in their slots under the urging of rack bar springs 58 each of which is connected at one end to a forward portion of the rack bar and at its other end to a relatively fixed portion of the frame.

The rear end of each rack bar is provided with rack teeth 59 to engage the gearing 23 to set the imprinting means 24.

When the check writing machine is operated, that is when the lever 27 is swung through its full stroke, the amount of rearward movement of each rack bar 22 will be determined by the particular key in its associated order which has been depressed, depression of a key serving to elevate the hooks 43 thus to free the stop bars for movement while also serving to afford a stop to be contacted by one of the stop lugs 50 or 50a as the stop bar moves rearwardly. Such rearward movement of the stop bar is permitted by rearward movement of the movable bar 57. The hooks 43 for each order of the machine are so positioned relative to the lugs 47 so as to permit some rearward movement of the stop bar in the event no key in such order had been depressed. The amount of rearward movement permitted each stop bar, and hence each rack bar, is such as to move the imprinting means so as to register "0" in the order. To prevent the imprinting of 0's in any order above the units dollars order (that is above the third order on the machine), additional hooks (not shown) are provided which serve to restrain the stop bars in such higher orders against movement when no key in such order has been depressed. The imprinting means are so arranged that in the event no movement is permitted the stop bar, stars will be printed in the higher orders rather than 0's. The additional hooks just mentioned in the higher orders are provided with interlocking mechanism so that in the event a key in a higher order is depressed such depression serves not only to release both hooks in the higher order, but also to release all of the second group of hooks in all lower orders thereby to permit the printing of 0's in such lower orders. Inasmuch as the mechanism just described forms no part of the present invention, it is not illustrated completely in the drawings although a portion thereof may be seen at the left-hand end of Fig. 1.

Inasmuch as all of the rack bars are spring urged toward rearward movement, the speed of such movement is determined by the speed of movement of the movable bar 57 which in turn is moved by the operating lever 27. Should the lever 27 be operated rapidly, an ensuing rapid motion of the rack bars would occur and on occasion the rack bars have rebounded on the terminus of their rearward movement and thus falsely set up the imprinting means to print an erroneous number. To prevent rebound of the rack bars each is provided at its lower front end with a series of ratchet teeth 60 each engaged by pawls 61 rotatably mounted on shaft 62, with the pawls being urged against the ratchet teeth by springs 63. Inasmuch as the pawls and ratchet teeth must be disengaged to permit the rack bars to move forwardly upon the completion of the imprinting operation, means are provided for simultaneously releasing all of the pawls upon the initiation of the return stroke of the lever 27. To this end there is provided a clearing member comprising an elongated bar 64 which extends transversely under all of the rack bars and provided with side portions 65 rotatably mounted on shaft 62. A spring 67 is provided for rotating the clearing member counterclockwise (as seen in Fig. 1) to move the same out of disengaging contact with the pawls and means hereinafter to be described are provided for rotating the clearing member in the opposite direction to cause it to contact all of the pawls and shift them out of engagement with the ratchet teeth.

*The gearing and imprinting means*

The gearing means 23 are supported on a transverse shaft 70 fixed in the frame of the machine. Rotatably mounted on the shaft 70 is a segmental gear 71 having teeth engaging the teeth of the rack 59 at the rear end of the rack bars and fixed to an adjacent gear 72. The gear 72 engages a pinion 73 rotatably mounted on a second cross shaft 74 fixed to the frame. Each of the pinions 73 is secured to an associated imprinting wheel 75 carrying numbers from "0" to "9" and a star.

Figures 3, 10:
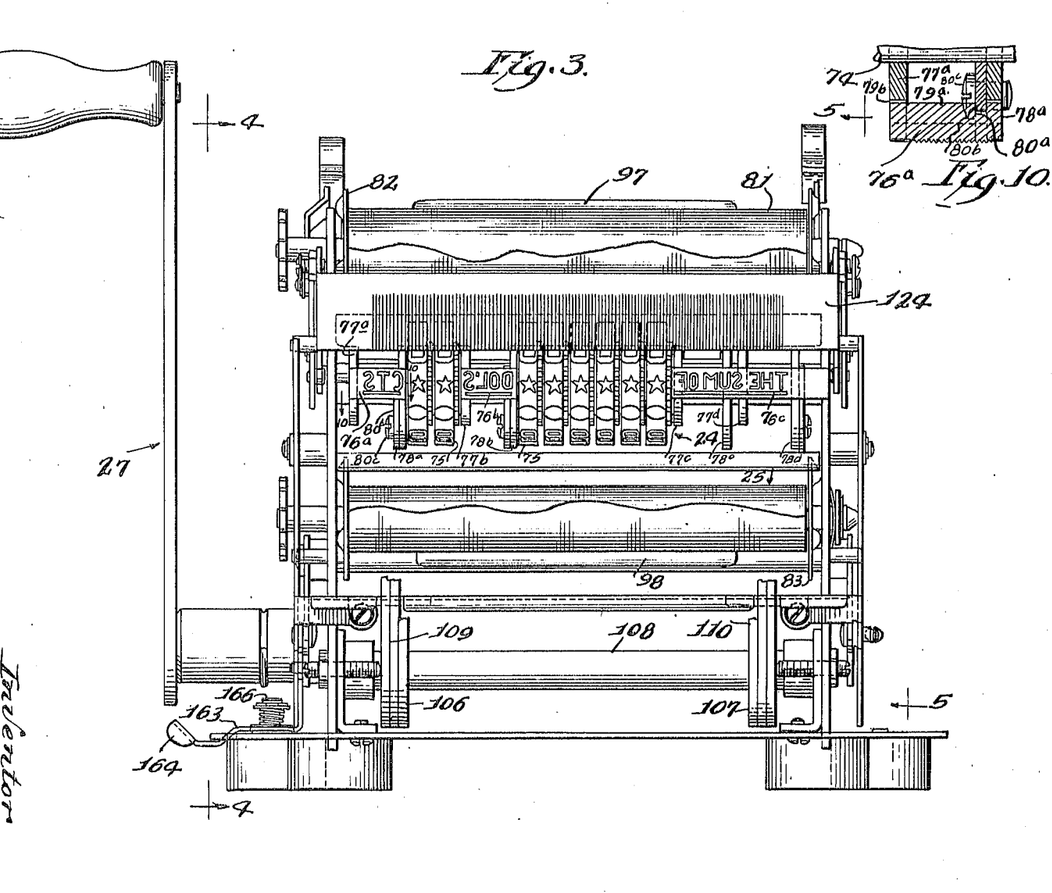
Fig. 3 is a staggered vertical section taken along line 3—3 of Fig. 1.
Fig. 10 is an enlarged horizontal section showing certain details of the imprinting mechanism and taken along line 10—10 of Fig. 3.

As best shown in Fig. 3, the imprinting wheels 75 are positioned so as to have the two "cents" orders at the right-hand portion of the machine (the left-hand portion of the imprinting means as seen in Fig. 3) and spaced from the six imprinting wheels for the dollars orders of the machine. Adjacent the cents orders is an imprinting plate 76a provided with the letters CTS thereon to indicate cents while on the opposite side of the first two orders of the imprinting means is a second imprinting plate 76b carrying the letters "Dol's." A third imprinting plate 76c may be provided on the opposite side of the dollars orders of the imprinting wheels which may bear a legend such as "The sum of" as shown. The imprinting plates are each carried by the base of a U-shaped member, the legs of which are firmly secured to transordinal rods in the machine firmly to position the imprinting plates. Thus, for example, the imprinting plate 76a is provided with a long leg 77a secured to shafts 70 and 74 and a short leg 78a secured to the shaft 74. Thus each of the legs 77a and 78a is provided with an opening encircling the shafts mentioned to provide a firm and solid backing for the imprinting plate 76a. The plate 76b is provided with a long and short leg 77b and 78b, respectively, while the imprinting plate 76c is provided with two long legs 77c and 77d and two short legs 78c and 78d, with all of the longer legs encircling shafts 70 and 74 and the shorter legs encircling the shaft 74 as described for the plate 76a.

Figure 6:
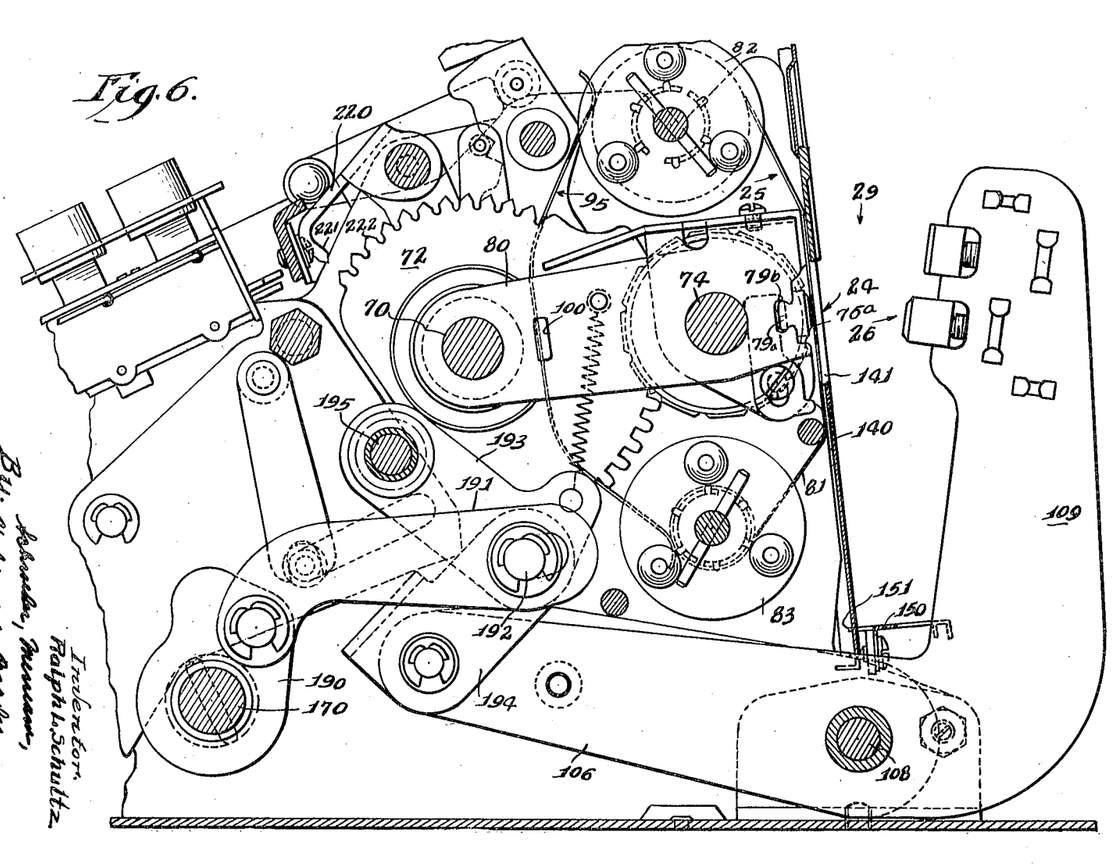
Fig. 6 is an enlarged vertical section showing a portion of the mechanism of the machine interior of the cover and taken along line 6—6 of Fig. 2.

Each of the imprinting plates 76a—76c is readily removable from the machine for replacement and for this purpose each of the plates is provided on its rear surface with a dovetail such as the dovetail 79a for the plate 76a (see Fig. 6). The dovetail 79a is received in a dovetail groove 79b formed in the base of the previously mentioned U-shaped member. The dovetail and groove just mentioned serve to hold the imprinting plates against in and out movement relative to the macerating means, and to hold the same against lateral movement each is provided with a groove 80a on its rear surface (see Fig. 10) which is engaged by a retaining plate 80b which may be pivoted to retaining position and held therein by a screw 80c. To remove the imprinting plate 76a it is merely necessary to loosen the screw 80c and rotate the plate 80b so as to remove it from the slot 80a whereupon the imprinting plate 76a may be slid from within the dovetail groove. Similar screws and locking plate arrangements are provided for each of the other imprinting means 76b and 76c.

*The inking means*

The inking means 25 comprises a relatively wide ribbon 81 extending between an upper spool 82 and a lower spool 83. The upper spool is provided with trunnions 84 (Fig. 5) on each end and means are provided for permitting easy removal of the upper spool for replacement of the ribbon. For this purpose the trunnions 84 on the upper spool are received in slots 85 formed in a fixed plate 86 of the machine. The lower spool which is not removable is provided with trunnions 87 which are received in fixed openings in the frame of the machine. The trunnions 84 of the upper spool are held in the slots 85 by means of a braking arm 88 which is pivoted to the frame 89 and urged by a spring 90 against the trunnion. The arms 88 are guided through the medium of a guide slot 91 formed therein which engages a guide pin 92 fixed in the frame. To remove the upper spool it is only necessary to grasp the trunnions and lift the spool bodily out of the slots 85. Upon replacing the ribbon the upper spool may be reinserted in the slots simple by applying pressure which serves to move the arms 88 against the tension of their spring and thus allows the trunnions to snap into position in the slots 85.

As previously noted the inking ribbon is subjected to considerable wear as it contacts the numbers of the imprinting wheels on one side and is pressed thereagainst by the check whose opposite surface is contacted by the macerating means 26. It has been found that by the provision of ironing means contacting the ribbon as it is wound up on the spool wrinkles and other uneven portions of the ribbon may effectively be ironed out and, in fact, by employing the ironing means of this invention a single ribbon may be used for almost an indefinite period without the necessity of replacement. As best shown in Fig. 12, the ironing means 95 comprises a resilient leaf-spring-like member having two spaced side portions 96 and integral, flat, elongated, end portions 97 and 98. The end portion 97 is curved upwardly at its terminus as shown and bears against the ribbon on the upper spool 82 while the portion 98 bears against the ribbon on the lower spool 83. The side portions 96 are provided with integral ears 99 which are received in suitable openings 100 (Fig. 6) formed in the two of the backing plates 80. Thus the ironing means 95 is free to rock as the ribbon is wound on one of the spools and unwound from the other and thus to apply substantially equal resilient pressure against the ribbon on each spool. It is not essential that the ribbon contacting portions of the ironing means extend the entire length of the ribbon or even that they extend the entire length of the imprinting means although it is preferable that the ironing means contact the ribbon throughout a substantial portion of its extent.

*The macerating means*

The macerating means 26 (Figs. 1, 4, 5 and 6) comprises a crank-like member 105 having a pair of arms 106 and 107 which are preferably made of triple thickness of metal, one of such arms being positioned on each side of the machine, with the member 105 being rotatable upon a cross shaft 108. The arms 106 and 107 curve upwardly to form the crank-like appearance of the member and terminate as arms 109 and 110, respectively. The arms 109 and 110 carry between their upper ends a pair of brackets 111 and 112 (Fig. 1) which are secured together and to the arms. Extending through suitable openings in the brackets 111 and 112 is a plurality of posts 113 each secured at one end to a lower macerating bar 114 and provided at its opposite end at the back surface of the bracket 112 with a spring washer 115 which serves to urge the post to the right (as seen in Fig. 1). To counteract the action of the spring washer and to provide rigidity for the macerating bar, there is provided a plurality of adjusting screws 116 threadedly received in the brackets 111 and 112 and contacting the rear surface of the macerating bar 114. To adjust the macerating bar the screws 116 may be rotated and thus to rock the macerating bar about a substantially vertical axis properly to align it with the macerating means and lock nuts 117 are provided for locking the adjusting screws in the desired position.

If desired, a perforating bar 120 may be provided on the carrier brackets 111 and 112 above the macerating bar 114. The perforating bar is provided on its face with a series of points, as shown in Fig. 1, and is mounted in the same manner as the bar 114 and for this purpose is secured to posts 121 which extend through suitable openings in the carrier brackets and are provided with springs 122 together with adjusting screws 123 and associated lock nuts.

Figure 4:
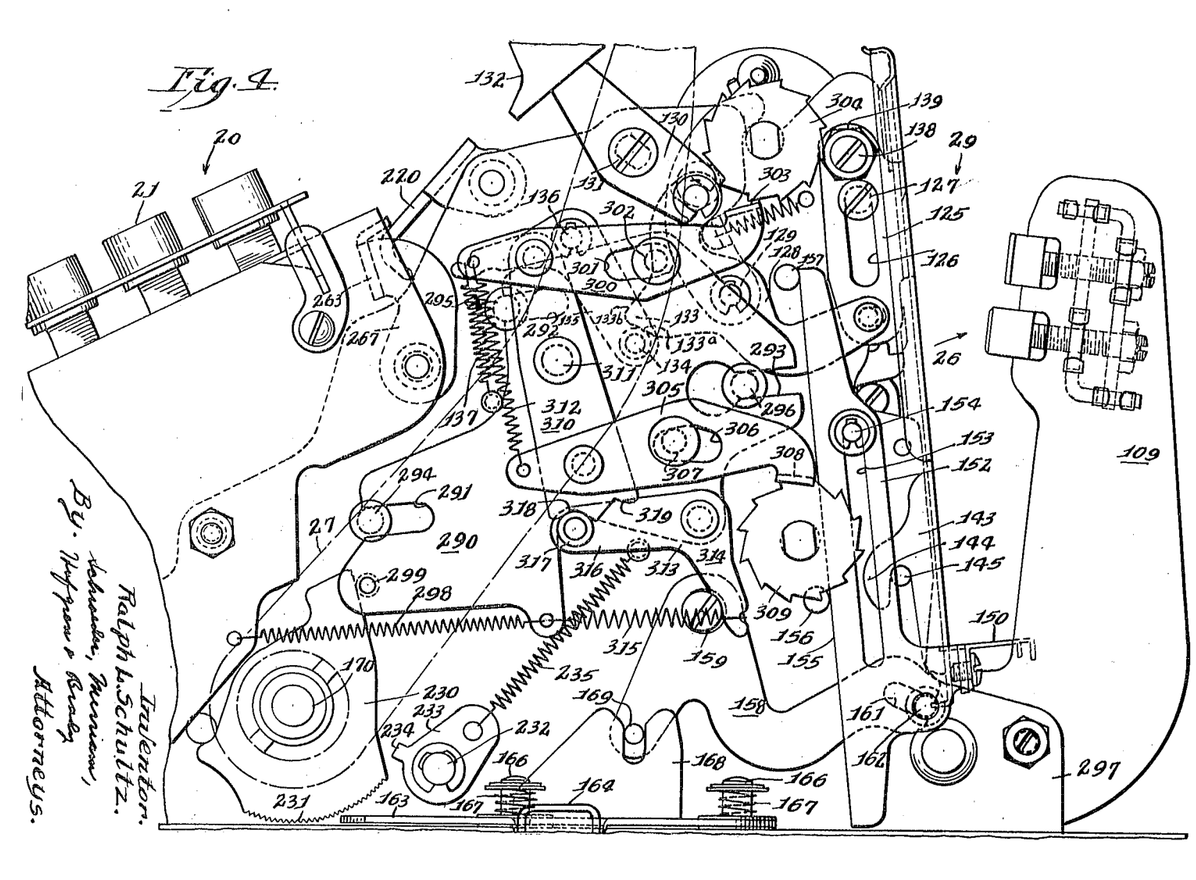
Fig. 4 is an enlarged vertical section taken along line 4—4 of Fig. 3.

The perforating bar 120 is provided, where it is desired to perforate the name of the payee of the check, so that it cannot be altered. Where such operation is contemplated the bar 120 is used in conjunction with a backing plate 124 (Fig. 3). The backing plate 124 is movable vertically from a position aligned with the bar 120 to a second position out of alignment therewith, and for this purpose is provided with side pieces 125 (Fig. 5) each provided with a slot 126 engaging a pin 127 fixed in the plate 86. The backing plate 124 is carried by one arm of a pair of cranks 128 each of which is pivoted at 129 to the side of the machine, with the other arm pivoted to an ear 130 secured to a transordinal shaft 131. As seen in Fig. 4 the ear on one side of the machine is provided with an actuating handle 132 whereby movement of the handle forward and back serves to raise and lower the backing plate through the means just described.

Detent means are provided for holding the shaft 131 and hence the backing plate 124 in either of its positions and for this purpose the crank 128 on the right-hand side of the machine (see Fig. 4) is provided with an outwardly extending portion 133 engageable with a detent 134 carried on a crank 135 pivoted at 136 to the frame. A spring 137 is connected at one end to the frame and at its other end to the outer portion of the other arm of the crank so as to constantly urge the detent 134 into contact with the outwardly extending portion 133. As the lever 132 is shifted from the position shown in Fig. 4 the crank 128 will be rotated so as to move the detent from engagement with the surface portion 133a as shown into engagement with the surface 133b, thus to retain the crank in its other position.

The perforating bar 120 is provided with a plurality of vertical rows of perforating points which, when used to perforate the name of the payee, must be aligned with the slots in the backing bar. To assure proper alignment of the perforating pins and the slots in the bar, means are provided for shifting the bar laterally of the machine to properly align the slots. For this purpose the side plates 125 are provided with threaded studs 138, each stud being threaded into the side plates and bear against the frame on opposite sides of the machine. Thus by rotating the studs the side plates can be shifted laterally to proper position and when so shifted are held in position by lock nuts 139.

The check slot

A check to be imprinted is inserted in the slot 29 defined between a removable plate 140 overlying the ribbon 81 and the upstanding macerating means. The plate 140 is positioned to stand at an acute angle with respect to the horizontal so as to permit a check to lean thereagainst and is provided with an aperture 141 at the location of the imprinting means (Fig. 1). The upper portion of the plate is provided with a lip 142 adapted to lie behind the backing plate 124 and is provided at its lower end with a pair of side brackets 143, with each bracket having a hook 144 adapted to lap over pins 145 provided on the frame of the machine.

The bottom of the slot is formed by a platform 150 adapted to support a check on edge. The platform extends substantially the entire width of the slot 29 and is provided with a plurality of fingers 151 extending into vertically elongated openings in the plate 140 so as to prevent the bottom edge of a check in the slot from being caught between the juncture of the platform 150 and the plate 140.

As previously noted, the platform 150 may be moved vertically in the slot 29 so as to align a check with the imprinting means. For this purpose the opposite ends of the platform are secured to a pair of brackets 152, one on each side of the machine, with each being provided with a vertical slot 153 engaging a pin 154 fixed to the machine. The bracket has a substantially straight, front edge 155 contacting fixed pins 156 and 157 to guide the brackets 152 for vertical movement. Vertical movement of the brackets 152, and hence vertical movement of the platform 150, is achieved through the medium of a pair of cranks 158 slidably connected to the bottom of the brackets through the medium of a slot 161 in one end of the crank and a pin 162 fixed to the lower end of the bracket. Each of the cranks 158 is secured to a transordinal shaft 159 and the crank on the right-hand side of the machine (Fig. 4) is connected to a manually operable member 163 slidably mounted on the bottom frame plates of the machine. The member 163 is provided with a finger contacting portion 164 and is provided with a slot (not shown) through which pins 166 extend. Compressed between a washer at the top of each of the pins 166 and a washer overlying the member 163 is a pair of springs 167 to cause the lower washers to exert frictional pressure on the upper surface of the member 163 to hold the same in adjusted position. The member 163 is provided with an upstanding portion 168 having a notch therein engaging a pin 169 provided on the end of the other arm of the crank 158 and thus sliding movement of the member 163 causes rotation of the cranks 158 and shaft 159 to move the platform 150 vertically. It will be noted that the finger actuable portion 164 is positioned some distance from the slot 29 so that it may be reached and moved by the fingers of an operator without touching a check in the slot and thus without danger of contacting and misaligning a check.

The operating mechanism

Manually actuable means are provided for operating the various mechanisms previously described. To this end the lever 27 is secured to an actuating shaft 170 which is provided with a plurality of cams, power arms and the like for operating the various parts of the check writing machine.

Figures 8, 9:
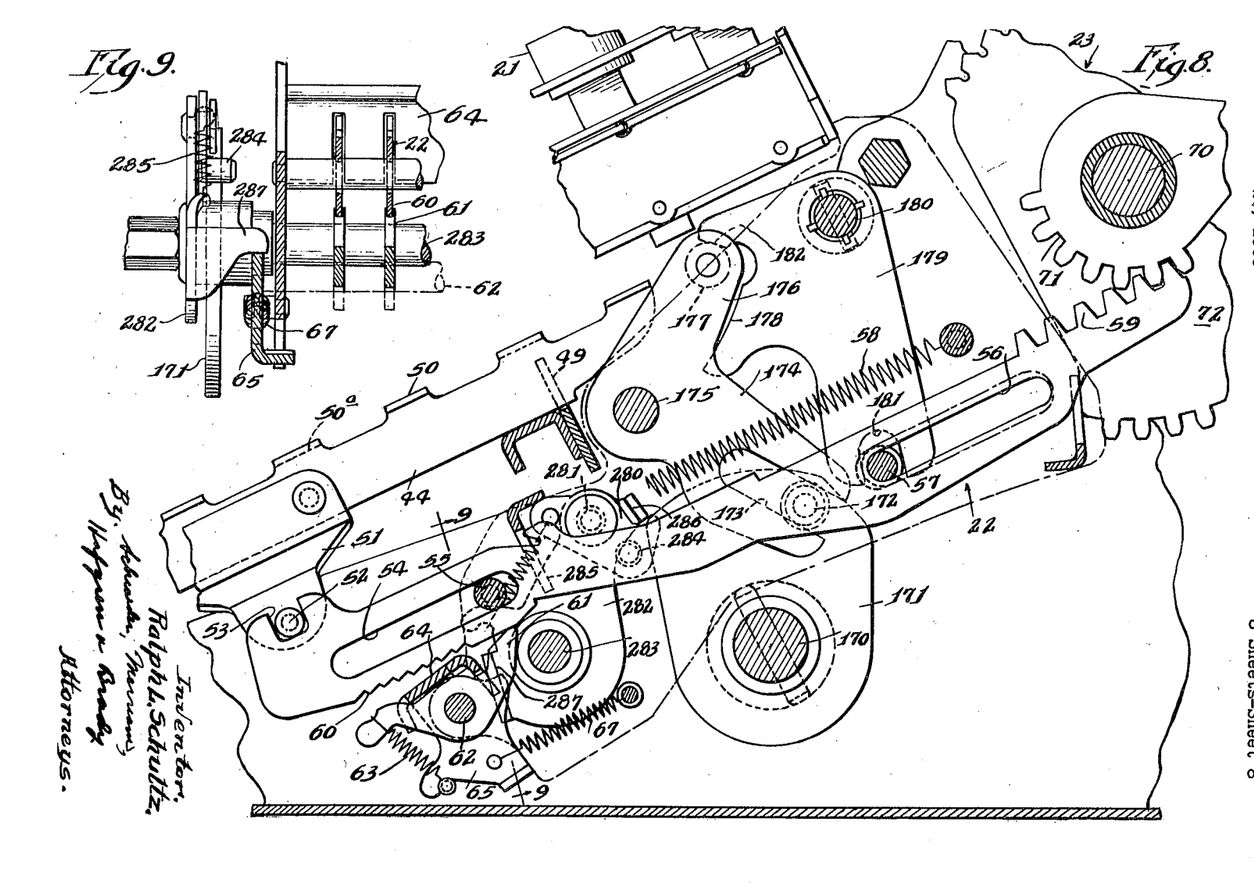
Fig. 8 is an enlarged vertical section along line 8—8 of Fig. 2.
Fig. 9 is an enlarged vertical section showing the pawl clearing means and taken along line 9—9 of Fig. 8.
Figure 11:
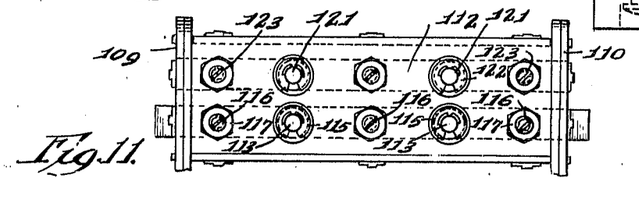
Fig. 11 is a side elevational view of the mounting and adjusting mechanism for the mascerating means taken along line 11—11 of Fig. 1.

Referring now to Fig. 8, the means for setting the imprinting wheels upon forward movement of the lever 27 will be seen to comprise a cam 171 fixed to the shaft 170 and provided with a dolly roll 172 movable in a slot 173 formed in one arm of a crank 174 which is pivoted on a cross shaft 175. The other arm 176 of the crank carries a dolly roll 177 positioned to engage a cam surface 178 provided on a movable element 179 pivoted to a cross shaft 180. The element 179 has a slot 181 engaging the movable rack control bar 57 so that the shaft 170 is rotated counterclockwise (as seen in Fig. 8). The bar 57 is moved rearwardly permitting the rack bar springs 58 to move the rack bars toward the rear of the machine to rotate the imprinting wheels through the medium of the gearing 23 as previously described. The cam surface 178 has a first portion 182 which acts somewhat in the nature of a lost motion connection between the dolly roll 177 and cam surface 178 to allow some movement of the crank 174 before such movement is imparted to the element 179.

In imprinting and macerating a check the macerating means are moved toward the imprinting means to apply macerating pressure against a check interposed therebetween. Such movement of the macerating means is accomplished by mechanism best seen in Fig. 6 wherein there is shown a power plate 190 fixed to the shaft 170 and pivotally connected to a power arm 191 pivoted at its other end to a cross shaft 192. The cross shaft serves as the central link between a pair of toggle arms 193—194, there being one pair of such toggle arms for each arm 106 and 107 of the member carrying the macerating means. The upper end of the upper toggle arm 193 is pivoted to the frame at 195 while the lower end of the lower toggle arm 194 is pivoted to the free end of the arm 106 of the macerating means. A similar toggle arrangement is pivoted to the free end of the arm 107 on the opposite side of the machine.

Thus as the shaft 170 is rotated counterclockwise (as seen in Fig. 6) the arm 191 is moved toward the front of the machine bringing the toggle arms 193—194 toward dead center position. This movement of the toggle arms pivots the arms 106 and 107 about the shaft 108 in a counterclockwise direction to move the macerating means toward and finally into engagement with the back side of a check positioned in the slot 29 to force the face of the check against the ribbon and imprinting means.

During the first portion of movement of the lever 27 toward the front of the machine the rack bars are operated to set up the proper figure on the imprinting means and the macerating means are pivoted toward the imprinting means but do not pressingly engage a check until later in the forward stroke of the lever. Mechanism is provided for returning the handle to its starting point which make take the form of a return spring. Inasmuch as in the final portion of the forward stroke of the lever the imprinting actually takes place, it is clear that the greatest resistance to operation is met during such final portion of the stroke. In order to reduce the manual force required to effect imprinting the return spring is so arranged as to be substantially completely tensioned before the lever enters the final portion of its stroke and additional power storage means are provided which store power therein during the first portion of the stroke of the lever when no imprinting is taking place and release the stored power in parallel with the lever during the actual imprinting operation and thus adds its force to the manual force applied to the lever to reduce total force that must be supplied by the operator.

Figure 7:
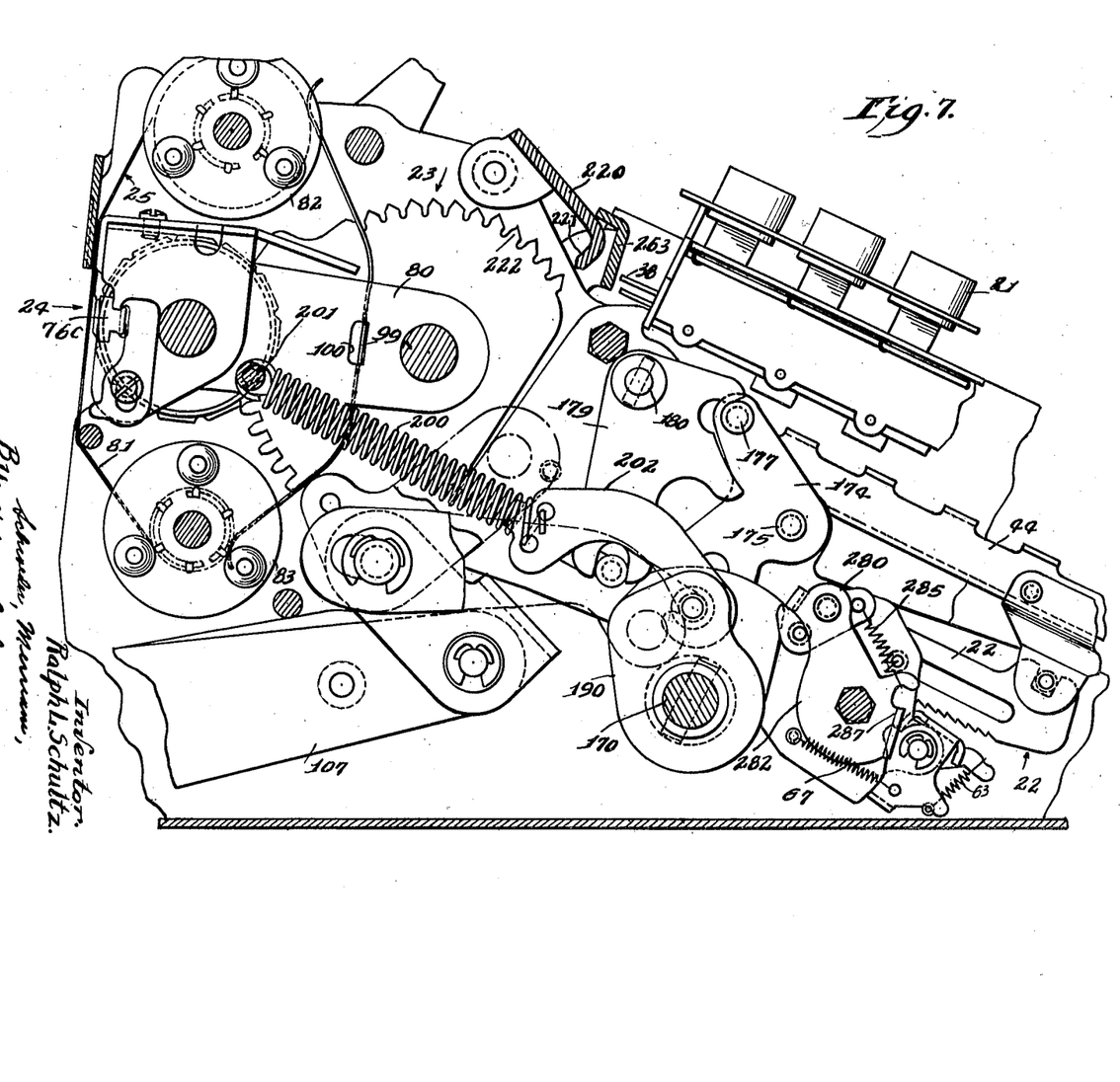
Fig. 7 is an enlarged oppositely facing vertical section taken along line 7—7 of Fig. 2.

Referring now to Fig. 7, there is shown a return spring 200 secured at one end to a fixed pin 201 and at its other end to a link 202 pivoted to the power plate 190 at a point remote from the axis of rotation of the actuating shaft 170. It will be noted that the link 202 has an arcuate undersurface so as to be able to, in effect, straddle the shaft 170, and as the shaft is rotated in a clockwise direction (as seen in Fig. 7) during the initial portion of the stroke of the lever 27, the return spring is stretched to its fullest extent and as the last portion of the stroke of the lever is approached, the point of connection of the link 202 to the power plate 190 approaches dead center alignment with the axis of rotation of the shaft 170 and the pin 201 so that little or no stretching of the spring occurs.

Figure 5:
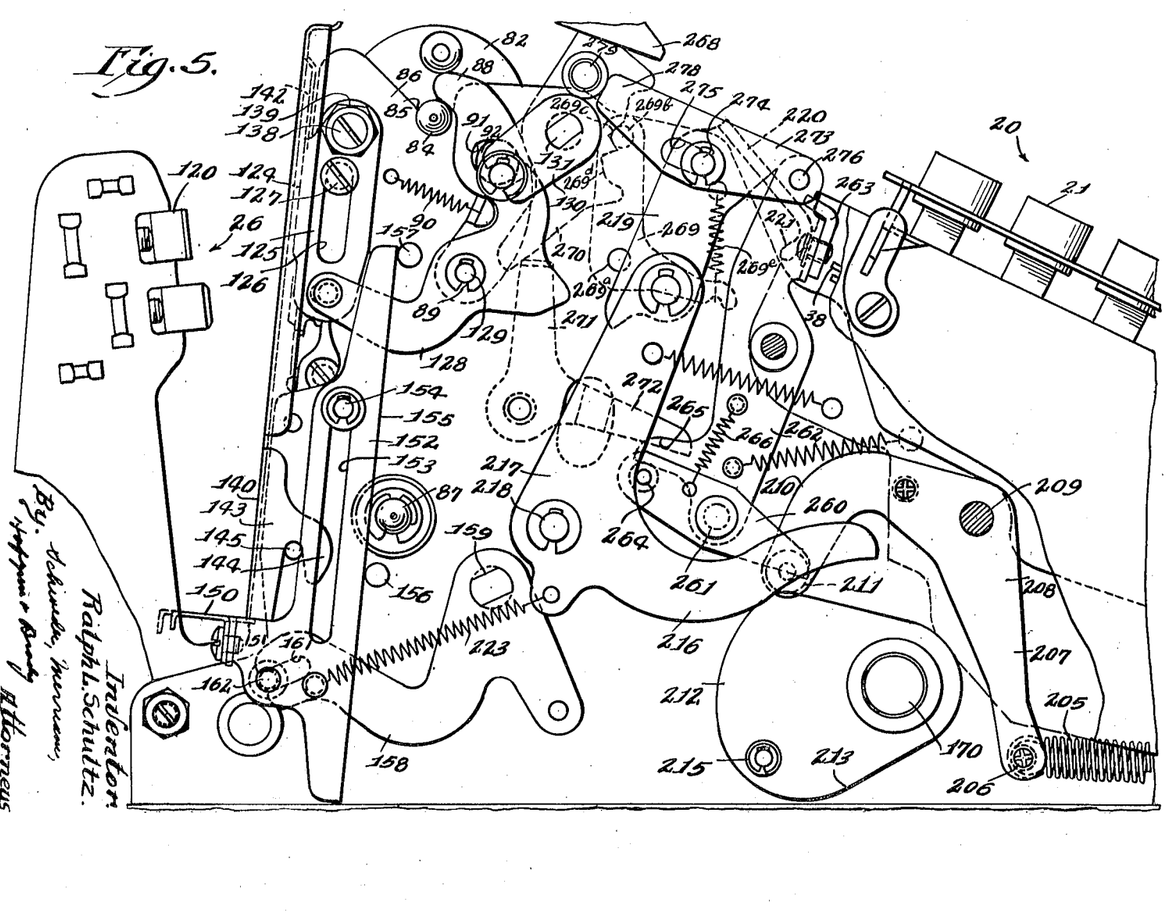
Fig. 5 is an enlarged oppositely facing vertical section taken from the other side of the machine along line 5—5 of Fig. 3.

The power storage means is best illustrated in Fig. 5 and comprises in the embodiment illustrated an equalizing spring 205 having one end secured to the frame and being secured at its other end at 206 to one arm 207 of a crank 208 pivoted to the frame at 209. The other arm 210 of the crank carries a dolly roll 211 riding on the exterior surface of a cam 212 fixed to the shaft 170. As the shaft 170 is rotated in a clockwise direction (as seen in Fig. 5) during the initial portion of the stroke the cam 212 stretches the equalizing spring 205. As the lever 27 is moved during the final and imprinting portion of the forward stroke the dolly roll engages the portion 213 of the cam and the energy stored in stretching the equalizing spring (and urging the crank 208 toward rotation in a counterclockwise direction) is transmitted to the cam 212 and hence to the shaft 170 to urge the shaft toward rotation in a clockwise direction and thus toward rotation in a direction to complete the forward stroke of the lever.

It is of course desirable in a check writer to provide means for insuring that all of the imprinting wheels are properly aligned so that all figures and numbers imprinted thereby will be on a perfectly straight line. Because of required manufacturing tolerances it is not feasible to machine all of the parts including the stop bars, rack bars, gearing means and the like to the accuracy that would be necessary to achieve proper alignment of the imprinting wheels. In order to insure proper alignment, however, additional means are provided which, as best shown in Fig. 5, include a dolly roll 215 carried by the cam 212 and adapted to contact an arm 216 on a crank-like member 217 pivoted to the frame at 218. The other arm of the crank is pivotally connected at its upper end to the side pieces 219 of an alignment bar 220. The side pieces 219, one at each end of the alignment bar, are pivotally connected to the frame and the bar itself is provided with a lip 221 to engage teeth 222 (Fig. 6) provided along the upper portion of each of the gears 72. As the cam 212 is rotated clockwise (as seen in Fig. 5) the dolly roll contacts the arm 216 to rotate the same counterclockwise and thus to rotate the alignment bar clockwise to bring the lip portion 221 thereof into the teeth 222 and thus should any of the gears 72 be slightly out of position such gear will be rotated into proper position as the lip 221 is forced downwardly into engagement with the teeth carried thereby. As an added measure of precaution the particular machine shown is so constructed as to cause each of the gears 72 to very slightly overrun its ultimate desired position upon being rotated by the rack bars 22. Thus when the lip 221 is forced downwardly into the teeth 222 on each of the gears they are rotated in the reverse direction a slight amount but sufficient to properly align each of the imprinting wheels.

The anti-rebound pawls 61 have previously been described. These pawls engage the ratchet teeth 60 on each rack bar as it is moved forwardly under the action of its associated spring. Inasmuch as the ratchet teeth and pawls need be mounted and constructed as to have only sufficient strength to overcome any rebounding tendency of the associated rack bars they would not normally possess the requisite strength to prevent reverse rotation of the lever 27 should the operator decide to reverse its rotation in the middle of a stroke. To prevent breakage of the pawl mechanism means are provided to require the operator to complete a full stroke of the lever 27 before the stroke can be reversed and damage to the ratchet and pawls is prevented by means hereinafter described which release all of the pawls simultaneously upon the initiation of a return after the completion of a full stroke of the lever.

As shown in Fig. 4, the full stroke mechanism comprises a cam 230 fixed to the shaft 170 and provided along its lower edge with a plurality of ratchet teeth 231. Pivoted to the frame at 232 is a dog 233 having a lug 234 positioned to engage the teeth 231 as the cam is rotated counterclockwise (as seen in Fig. 4). A spring 235 is secured to the dog and anchored to the frame so as to constantly urge the dog to the position shown in Fig. 4. During the forward stroke of the lever the lug 234 rides over the ratchet teeth 231 and by engagement therewith effectively prevents the lever 27 from being moved on its return stroke until a full forward stroke has been completed at which time the lug 234 will have passed beyond the left-hand end of the teeth 231 freeing the cam 230 and hence the shaft 170 for return movement.

From the foregoing description of the operating mechanism it can be seen that during the forward stroke of the lever 27 the rack bars are released for whatever movement is permitted them by the stop bars initially to set the imprinting wheels while the macerating means are being moved toward the back side of a check in the check receiving slot. Toward the end of the forward stroke the alignment bar properly aligns all of the imprinting wheels and the actual imprinting and maceration of a check occurs during the final portion of the stroke with the assistance of the equalizing spring.

During the return stroke of the lever 27, that is the rearward stroke, all depressed keys on the keyboard are released, and the anti-rebound pawls are also released to permit the rack bars to be returned to their initial position in which they are held by re-engagement with the hooks 43.

To effect release of all of the depressed keys there is provided a one way dog 260 (see Fig. 5) pivoted at 261 to a lever 262 carrying at its upper end a release bar 263 which extends across the keyboard just to the rear of each order. The dog 260 is provided with a pin 264 at its opposite end urged into engagement with a stop 265 provided on the lever 262 by means of a spring 266. The opposite end of the release bar 263 is carried on an arm 267 (Fig. 4) pivoted to the frame. As the shaft 170 is rotated on the forward stroke of the lever (in a clockwise direction as seen in Fig. 5) the dolly roll 215 carried thereby contacts the dog 260 and merely pivots it about its pivot 261. On the return stroke of the lever 27 and the consequent counterclockwise movement of the shaft 170 the dolly roll 215 contacts the upper surface of the dog 260 and hence rotates the lever 262 to bring the release bar 263 carried thereby against the end of the catch bar 38 to move the same forwardly, thus releasing the detents 37 on each of the keys from engagement therewith. Upon such release springs associated with each of the keys move the same upwardly to their pre-existing condition.

In the event it is desired to imprint a number of checks with the same figure the machine is provided with a control lever 268 which serves to prevent operation of the release bar and thus to leave each of the keys in depressed condition. For this purpose the control lever 268 is pivoted to the frame on the shaft 131 and carries at its lower end a finger 270 adapted to contact one leg of a crank arm 271 whose other leg 272 is positioned immediately above the pin 264 on the dog 260. Movement of the control lever 268 toward the rear of the machine serves to move the arm 272 downwardly and thus pivot the dog 260 to a position where its end opposite that carrying the pin 264 will be moved out of the path of movement of the dolly roll 215 as the cam 212 is rotated.

To hold the lever 268 in its adjusted position there is provided a crank 269 pivoted at 269a to the frame of the machine and carrying a detent 269b on one arm thereof engageable with notches 269c or 269d provided on one surface of the lever 268. The detent is urged to engagement with the notches by a spring 269e.

The same control lever 268 may be used independently to clear the keyboard in case the operator has made an erroneous depression of keys. To this end a member 273 is slidable on a pin 274 by means of a slot 275 formed therein and one end of the member 273 is pivoted at 276 to the upper end of the lever 262. The opposite end 278 of the member 273 is positioned to be contacted by a pin 279 carried by the stem of the control lever 268 so that movement of the control lever toward the front of the machine causes sliding movement of the member 273 and thus forward movement of the release bar 263 to contact any catch bar 38 which has been moved rearwardly by a depression of a key in its order and thus to release such depressed key.

As previously pointed out, the anti-rebound pawls are released upon the initiation of the return stroke of the lever. Referring now to Figs. 8 and 9, a one way dog 280 is pivoted at 281 to a member 282 rotatable upon a cross shaft 283. The dog 280 is provided with a pin 284 to contact the cam 171. As shaft 170 rotates counterclockwise (as shown in Fig. 8) on the forward stroke of the lever, the dog 280 is free to pivot against the tension of its spring 285 without imparting rotation to the member 282. On the return stroke the cam 171 causes the dog 280 to engage and outstruck lug 286 on the member 282 to rotate the member in a counterclockwise direction. The member 282 is provided with a finger 287 positioned to contact the side portion 65 of the clearing member 64 and rotate the same simultaneously to depress all of the pawls, thus freeing them from engagement with the ratchet teeth 60 and thus permitting the rack bars to be moved to their starting position. To effect such movement of the rack bars it will be clear during the return stroke of the lever the movable element 179 will be rotated in a clockwise direction (as seen in Fig. 8), thus to move the movable bar 57 toward the front of the machine carrying the rack bars and their associated stop bars toward their forward starting position.

Means are provided for advancing the ribbon a predetermined distance each time the machine is operated and such mechanism is shown in Fig. 4 and includes a slide plate 290 having three slots 291, 292 and 293 engaging pins 294, 295 and 296 in a frame plate 297 fixed in the machine. The slide plate 290 is urged to the left (as seen in Fig. 4) by a spring 298. The slide plate carries a roller 299 engaging the cam 230 and as the shaft 170 is rotated counterclockwise during the forward stroke the slide plate 290 moves to the left following the cam 230. On the return stroke the slide plate is moved to the right to effect rotation of the ribbon spools. For this purpose a slide plate carries an upper dog 300 having a slot 301 pivotally engaging a pin 302 and is provided at its rear end with a lip 303 positioned to engage a ratchet wheel 304 on the upper ribbon roll 82. The slide plate also carries a lower dog 305 having a slot 306 engaging a pin 307 and the lower dog is also provided with a lip 308 to engage a ratchet 309 on the lower ribbon roll 83. The upper and lower dogs are interconnected by an arm 310 pivoted at 311 to the slide plate and there is provided a spring 312 connected to and extending between the forward ends of the dogs. Pivotally mounted on the slide plate is a crank 313 one arm 314 of which is provided with a spring 315 whose other end is fixed to the slide plate, and the other arm 316 of the crank carries a roller 317 positioned to engage one or the other of a pair of notches 318 and 319 provided on the bottom of the arm 310.

When the ribbon feed mechanism is in the position shown in Fig. 4, that is when the roll 317 engages the notch 318, the lips 303 and 308 are so positioned as to cause the former to clear the ratchet wheel 304 and the latter to contact the ratchet wheel 309 as shown so as to cause rotation of the lower spool. As the end of the ribbon is reached resistance to the rotation of the lower spool is encountered, which resistance is transmitted by the lower dog 305 to the arm 310 and serves to shift the arm to engage the notch 319 with the roller 317. This movement will reverse the operation of the dogs so as to cause the lip 303 to engage the upper ratchet 304, thus moving the ribbon in the reverse direction.

Operation

In using the check writer of this invention a check is placed in the receiving slot 29 with its lower edge resting on the platform 150. The platform, and hence the check, may be raised or lowered in order to cause the proper line on which the check amount is to be imprinted to be aligned with suitable scribe marks on the cover of the machine. If the payee's name is to be perforated the lever 132 would be operated to move the backing plate 124 downwardly into alignment with the perforating bar 120. The proper keys on the keyboard are depressed and held in depressed position by the catch bars 38. If an error occurs in setting up the figures on the keyboard, the lever 268 may be moved toward the front of the machine to release all of the keys whereupon they may be redepressed. If it is desired that a number of checks be imprinted with the same figures, the control lever 268 may be moved toward the rear of the machine so as to prevent operation of the key releasing mechanism on the return stroke of the lever.

With the machine so set up the lever 27 is rotated forwardly toward the front of the machine to cause the plate 190 to rotate, pivoting the arms 106 and 107 of the macerating means to move the latter means toward the back side of the check and the slot. Cam 171 rotates cranks 174 and 179, moving the bar 57 rearwardly permitting each of the rack bars to follow the bar 57 under the compulsion of their springs 58 to set each of the imprinting wheels 75. During this movement of the rack bars the pawls 61 engage the ratchet teeth 60 to prevent rebound of the rack bars in the event the handle is operated with some rapidity. If no key was depressed in the first three orders of the machine the hooks 43 therein permit only slight rearward movement of the associated rack bar so that the imprinting wheels associated therewith are positioned to print 0's. In higher orders the additional hooks previously mentioned serve to hold the rack bars against any movement so that stars are printed in those orders. The additional hooks are released in the event an adjacent higher order is operated so as to permit all orders below the highest operated order to print either a figure corresponding to the number of a key depressed therein or, if no key was depressed, to permit sufficient movement of the rack bar so that 0's rather than stars are printed.

During the first portion of the forward stroke of the lever the return spring 200 is tensioned nearly to its full extent and the equalizing spring 205 is also stretched. After the first portion of the forward stroke of the lever the return spring is no longer tensioned and the power stored in the equalizing spring is released through action of the crank 208 and cam 212, and thus during the actual imprinting operation the force of the equalizing spring is added to the manual force supplied to the lever. Before the final imprinting operation occurs, the cam 212 operates the aligning bar 220 to align all of the imprinting wheels properly and on the last portion of the forward stroke of the lever the actual imprinting and maceration of the check occurs.

On the return stroke of the lever 27 the one way dog 260 operates the key release bar 263 to release all depressed keys (unless the operation of that bar has been prevented by movement of the lever 268 rearwardly), and the one way dog 280 operates or cams 171 to rotate the pawl clearing member 64 to free all of the pawls from the ratchet teeth 60. Also during the return stroke the ribbon advancing mechanism engages either the upper or lower ratchet wheel on the ribbon spool to advance the ribbon a predetermined amount.

I claim:

1. In a check writing machine having imprinting means, macerating means and an actuating lever movable by manual power to cause relative approaching movement between the imprinting and macerating means during the first portion of movement of the lever, said lever being constantly connected to one of said means to cause pressing engagement between the imprinting means and the macerating means during the last portion of movement of the lever to imprint a check interposed between said means, stroke equalizing means comprising a power storing element, means connecting the element to said lever to store in said element a portion of the power applied to said lever during said first portion of its movement, a return spring, means operatively connecting the return spring to the lever progressively to tension the return spring during said first portion of lever movement means operating during said last portion of the movement of the lever for releasing at least a portion of the power stored in said element and to apply such released power in parallel with the manual force applied to said lever, and means operating substantially simultaneously with the last named means substantially to relieve the lever from the bias of the return spring.

2. In a check writing machine having imprinting means, macerating means and an actuating lever movable by manual power to cause relative approaching movement between the imprinting and macerating means during the first portion of movement of the lever, said lever being constantly connected to one of said means to cause pressing engagement between the imprinting means and the macerating means during the last portion of movement of the lever to imprint a check interposed between said means, stroke equalizing means comprising a power storage spring, means connecting the power storage spring to said lever to tension the spring during said first portion of the movement of the lever, a return spring, means operatively connecting the return spring to the lever progressively to tension the return spring during said first portion of lever movement, means operating during said last portion of such movement for releasing at least a portion of the power storage tension of the spring and to apply the force released thereby in parallel with the manual power applied to said lever, and means operating substantially simultaneously with the last named means substantially to relieve the lever from the bias of the return spring.

3. In a check writing machine having imprinting means, macerating means and an actuating lever movable by manual power to cause relative approaching movement between the imprinting and macerating means during the first portion of movement of the lever and to cause pressing engagement between the imprinting means and the macerating means during the last portion of movement of the lever to imprint a check interposed between said means, stroke equalizing means comprising a rotatable shaft in the machine and connected to the lever for rotation thereby, a power storage spring, means connecting said spring to the shaft to tension the spring during said first portion of movement of the lever, a return spring, means connecting the return spring to the shaft progressively to tension the return spring during said first portion of movement of the lever to bias the shaft toward return rotation, and means operating during said last portion of movement of the lever for releasing at least a portion of the tension of the power storage spring and to apply the force released thereby to the shaft in parallel with the manual power applied to the lever and simultaneously permitting the shaft to rotate without substantially increasing the tension of the return spring.

4. In a check writing machine having imprinting means, macerating means and an actuating lever movable by manual power to cause relative approaching movement between the imprinting and macerating means during the first portion of movement of the lever and to cause pressing engagement between the imprinting means and the macerating means during the last portion of movement of the lever to imprint a check interposed between said means, stroke equalizing means comprising a rotatable shaft in the machine and connected to the lever for rotation thereby, a power storage spring, means connecting said spring to the shaft to tension the spring during said first portion of movement of the lever, a return spring, means connecting the return spring to the shaft progressively to tension the return spring during said first portion of movement of the lever to bias the shaft toward return rotation, means operating during said last portion of movement of the lever for releasing at last a portion of the tension of the power storage spring and to apply the force released thereby to the shaft in parallel with the manual power applied to the lever, and means operating substantially simultaneously with the last named means substantially to relieve the shaft from the bias of the return spring.

5. In a check writing machine having imprinting means, macerating means and an actuating lever movable by manual power to cause relative approaching movement between the imprinting and macerating means during the first portion of movement of the lever and to cause pressing engagement between the imprinting means and the macerating means during the last portion of movement of the lever to imprint a check interposed between said means, stroke equalizing means comprising a rotatable shaft in the machine and connected to the lever for rotation thereby, a power storage spring, a cam on the shaft, a cam follower riding on the cam and connected to the power storage spring, said cam being formed with a first surface to contact the cam follower during said first portion of movement of the lever substantially completely to tension the power storage spring and said cam having a second surface to contact the cam follower during said second portion of movement of the lever and shaped to relieve the tension of the power storage spring and to apply the force released thereby to the shaft in parallel with the manual power applied to the lever, a return spring, means operatively connecting the return spring to the lever progressively to tension the return spring during said first portion of lever movement to bias the lever toward return rotation, and means operating substantially simultaneously with the application of force by the power storage spring to the shaft to releave the lever from the bias of the return spring.

References Cited in the file of this patent

UNITED STATES PATENTS

| | | |
|---|---|---|
| 615,024 | Hoff | Nov. 29, 1898 |
| 923,085 | Smith | May 25, 1909 |
| 1,442,059 | Engstrom | Jan. 16, 1923 |
| 1,682,779 | Fields | Sept. 4, 1928 |
| 1,716,699 | Kirkegaard | June 11, 1929 |
| 1,742,274 | Payne | Jan. 7, 1930 |
| 1,761,556 | Arnold | June 3, 1930 |
| 1,783,182 | Carlson | Dec. 2, 1930 |
| 1,871,993 | Hubbard | Aug. 16, 1932 |
| 1,916,538 | Smith | July 4, 1933 |
| 1,945,655 | Nicholson | Feb. 6, 1934 |
| 1,997,137 | Florance | Apr. 9, 1935 |
| 2,065,362 | Brendel | Dec. 22, 1936 |
| 2,112,536 | Payne | July 5, 1938 |
| 2,118,871 | Thompson | May 13, 1938 |
| 2,198,139 | Svensson | Apr. 23, 1940 |
| 2,231,237 | Welter | Feb. 11, 1941 |
| 2,329,646 | Payne | Sept. 14, 1943 |
| 2,342,082 | Klosterman | Feb. 15, 1944 |
| 2,482,726 | Clements | Sept. 20, 1949 |
| 2,558,616 | Johnson | June 26, 1951 |
| 2,687,088 | Hennessy | Aug. 24, 1954 |
| 2,707,432 | Rindfleisch | May 3, 1955 |